(12) United States Patent
Nakamura

(10) Patent No.: US 12,400,312 B2
(45) Date of Patent: Aug. 26, 2025

(54) METHOD AND APPARATUS OF INSPECTING PRINTED DOCUMENT

(71) Applicant: CANON KABUSHIKI KAISHA, Tokyo (JP)

(72) Inventor: Shun Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 18/059,899

(22) Filed: Nov. 29, 2022

(65) Prior Publication Data

US 2023/0177672 A1 Jun. 8, 2023

(30) Foreign Application Priority Data

Dec. 2, 2021 (JP) .................................. 2021-196003

(51) Int. Cl.
*G06T 7/00* (2017.01)
*G06V 30/244* (2022.01)
*G06V 30/413* (2022.01)
*G06K 7/14* (2006.01)

(52) U.S. Cl.
CPC .......... *G06T 7/0004* (2013.01); *G06V 30/245* (2022.01); *G06V 30/413* (2022.01); *G06K 7/1413* (2013.01); *G06K 7/1417* (2013.01); *G06T 2207/30144* (2013.01)

(58) Field of Classification Search
USPC ........................................................ 382/103
See application file for complete search history.

(56) References Cited

U.S. PATENT DOCUMENTS

| 2012/0182566 | A1 | 7/2012 | Sawano |
| 2013/0250370 | A1* | 9/2013 | Kojima ............... H04N 1/00047 358/405 |
| 2014/0002842 | A1* | 1/2014 | Ito ....................... B41F 33/0036 358/1.13 |
| 2014/0168709 | A1* | 6/2014 | Tokumaru ............... G06T 7/001 358/1.18 |
| 2019/0163335 | A1* | 5/2019 | Kamei ............... H04N 1/00915 |

FOREIGN PATENT DOCUMENTS

| EP | 3435649 A1 | 1/2019 |
| JP | 2012003335 A | 1/2012 |
| JP | 2017223459 A | 12/2017 |
| JP | 2019084800 A | 6/2019 |

* cited by examiner

*Primary Examiner* — Jacky X Zheng
(74) *Attorney, Agent, or Firm* — Canon U.S.A., Inc. IP Division

(57) ABSTRACT

An information processing apparatus inspecting printed contents of a printed sheet, the information processing apparatus includes a recognition unit configured to recognize the printed contents printed on the sheet, an acquisition unit configured to acquire an attribute value from information recognized by the recognition unit, a specification unit configured to specify a time required for inspection of the printed contents of the sheet by using the attribute value acquired by the acquisition unit, and a notification unit configured to issue a notification to a user based on a result of comparison between the required time specified by the specification unit and a time limit for inspection of the printed contents.

12 Claims, 13 Drawing Sheets

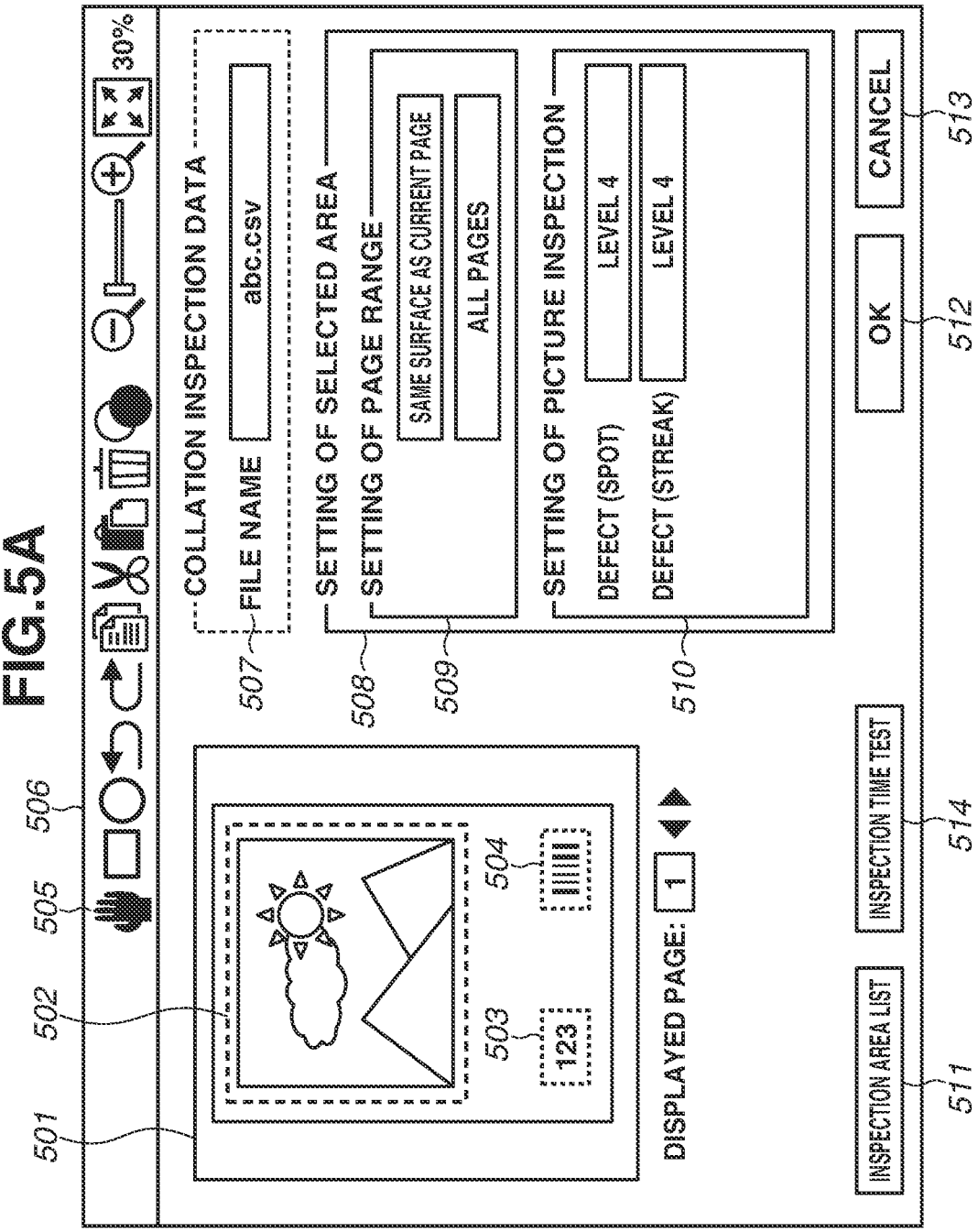

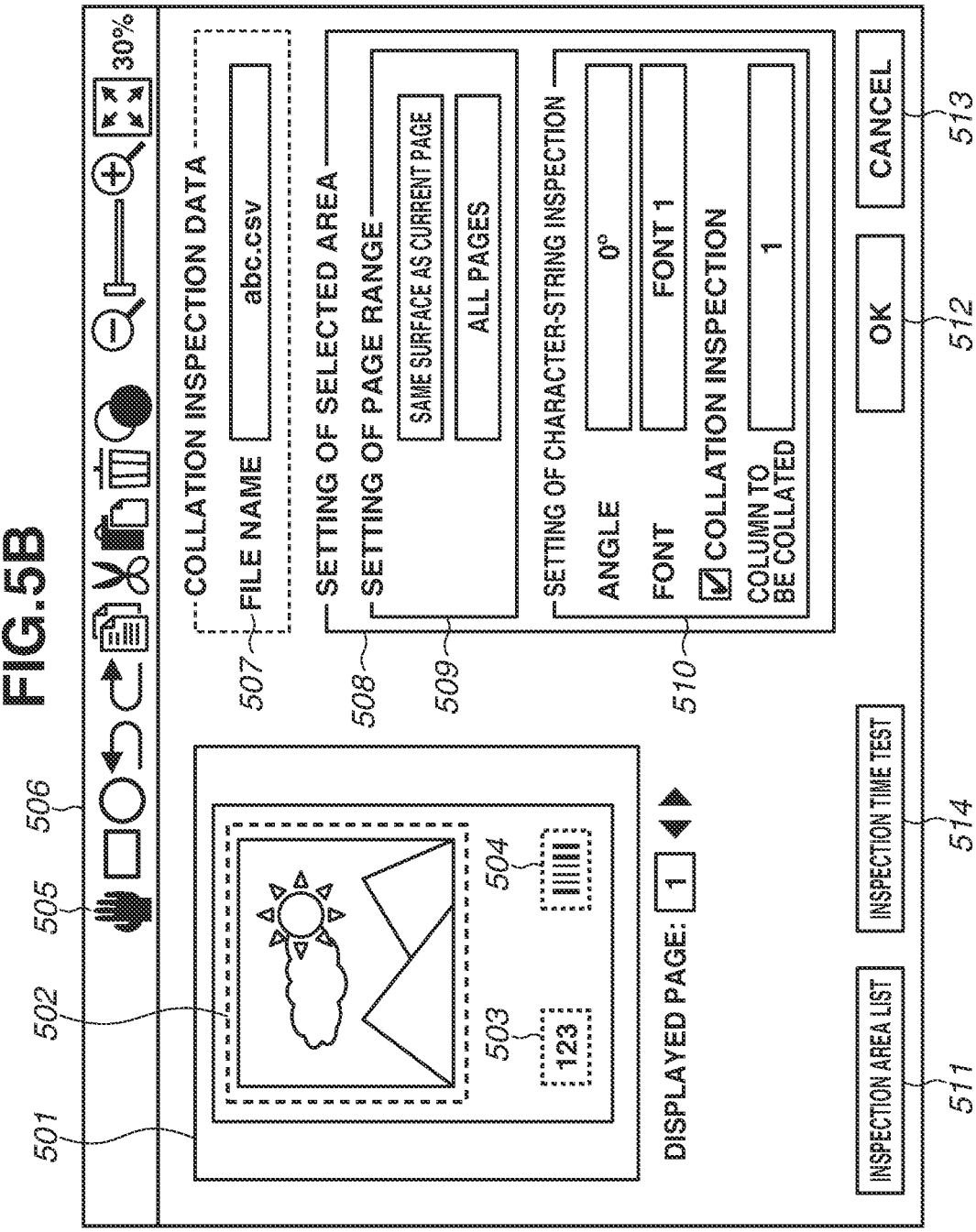

FIG.6

INSPECTION AREA LIST — 601

| TYPE OF INSPECTION AREA | REFLECTION RANGE OF INSPECTION AREA | SHEET | SURFACE | ANGLE | FONT | BARCODE | COLLATION INSPECTION | COLUMN TO BE COLLATED |
|---|---|---|---|---|---|---|---|---|
| PICTURE INSPECTION AREA | SAME SURFACE AS CURRENT PAGE | — | FRONT SURFACE | | | | | |
| PICTURE INSPECTION AREA | ONLY ONE PAGE | 1 | FRONT SURFACE | | | | | |
| STANDARD INSPECTION AREA | ALL PAGES | — | — | | | | | |
| CHARACTER-STRING INSPECTION | ALL PAGES | — | — | 90° | FONT 1 ▼ | | ☑ | 1 |
| CHARACTER-STRING INSPECTION | ALL PAGES | — | — | 0° | FONT 2 ▼ | | ☐ | 2 |
| BARCODE INSPECTION | ONLY ONE PAGE | 1 | FRONT SURFACE | 0° | | CODE 1 ▼ | ☑ | 1 |
| BARCODE INSPECTION | SAME SURFACE AS CURRENT PAGE | — | FRONT SURFACE | 0° | | CODE 2 ▼ | ☑ | 2 |
| BARCODE INSPECTION | ONLY ONE PAGE | 1 | FRONT SURFACE | 180° | | CODE 2 ▼ | ☑ | 3 |

602 / 603 / 604 / 605 / 606 / 607 / 608 / 609 / 610

[INSPECTION TIME TEST] — 612

[CLOSE] — 611

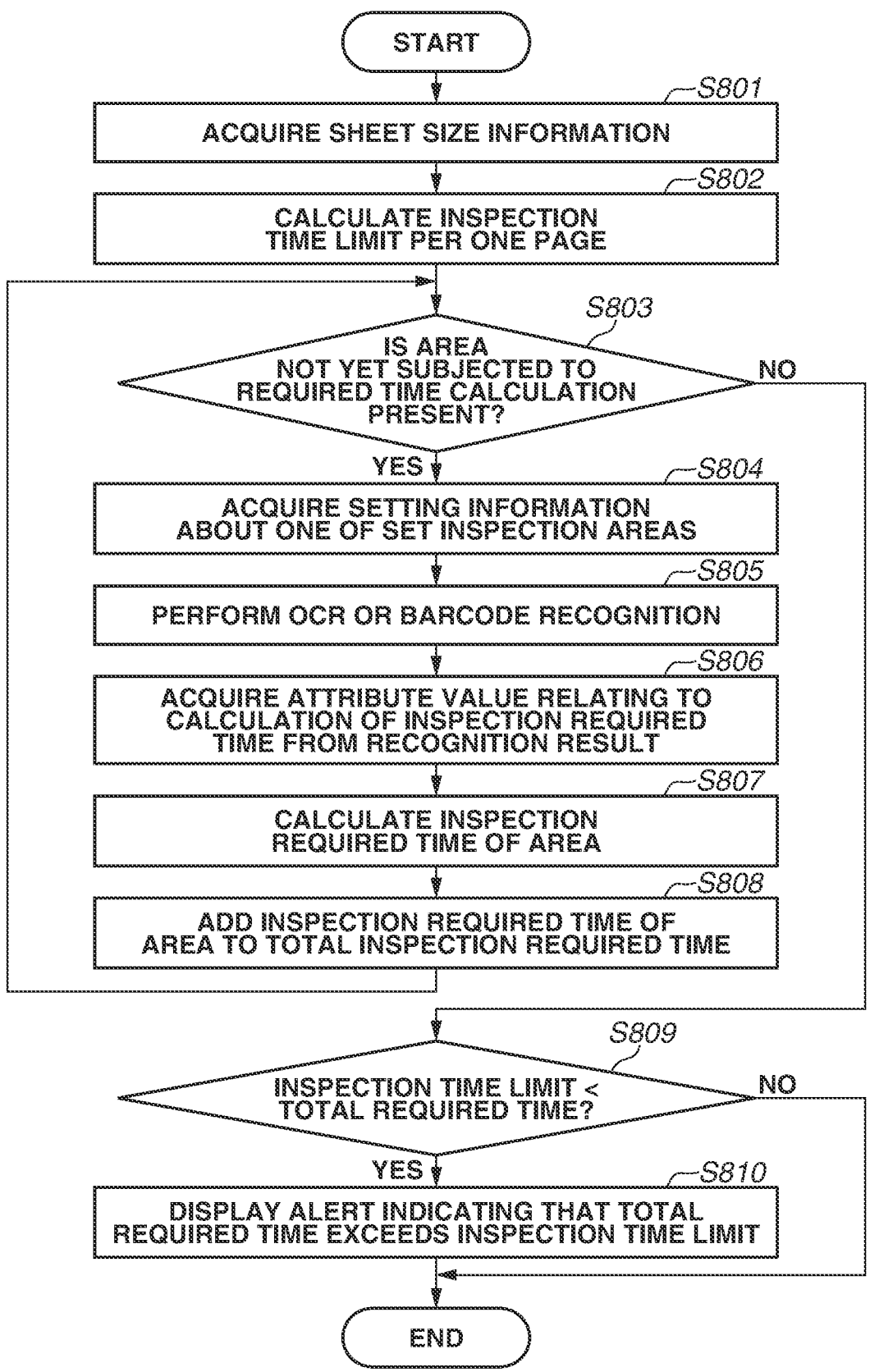

INSPECTION SETTING

WITH CURRENT DATA INSPECTION SETTING, INSPECTION REQUIRES MUCH TIME, AND INSPECTION MAY NOT BE CORRECTLY PERFORMED.

PLEASE REVISE INSPECTION SETTING.

INSPECTION SETTING

WITH CURRENT DATA INSPECTION SETTING, INSPECTION REQUIRES MUCH TIME, AND INSPECTION MAY NOT BE CORRECTLY PERFORMED.

PLEASE REVISE INSPECTION RESETTING WITH FOLLOWING HINTS AS REFERENCE.

HINTS:
- REDUCE NUMBER OF BARCODE INSPECTION AREAS
- REDUCE CELL SIZE OF BARCODE
- REDUCE DATA AMOUNT OF BARCODE

[ OK ]

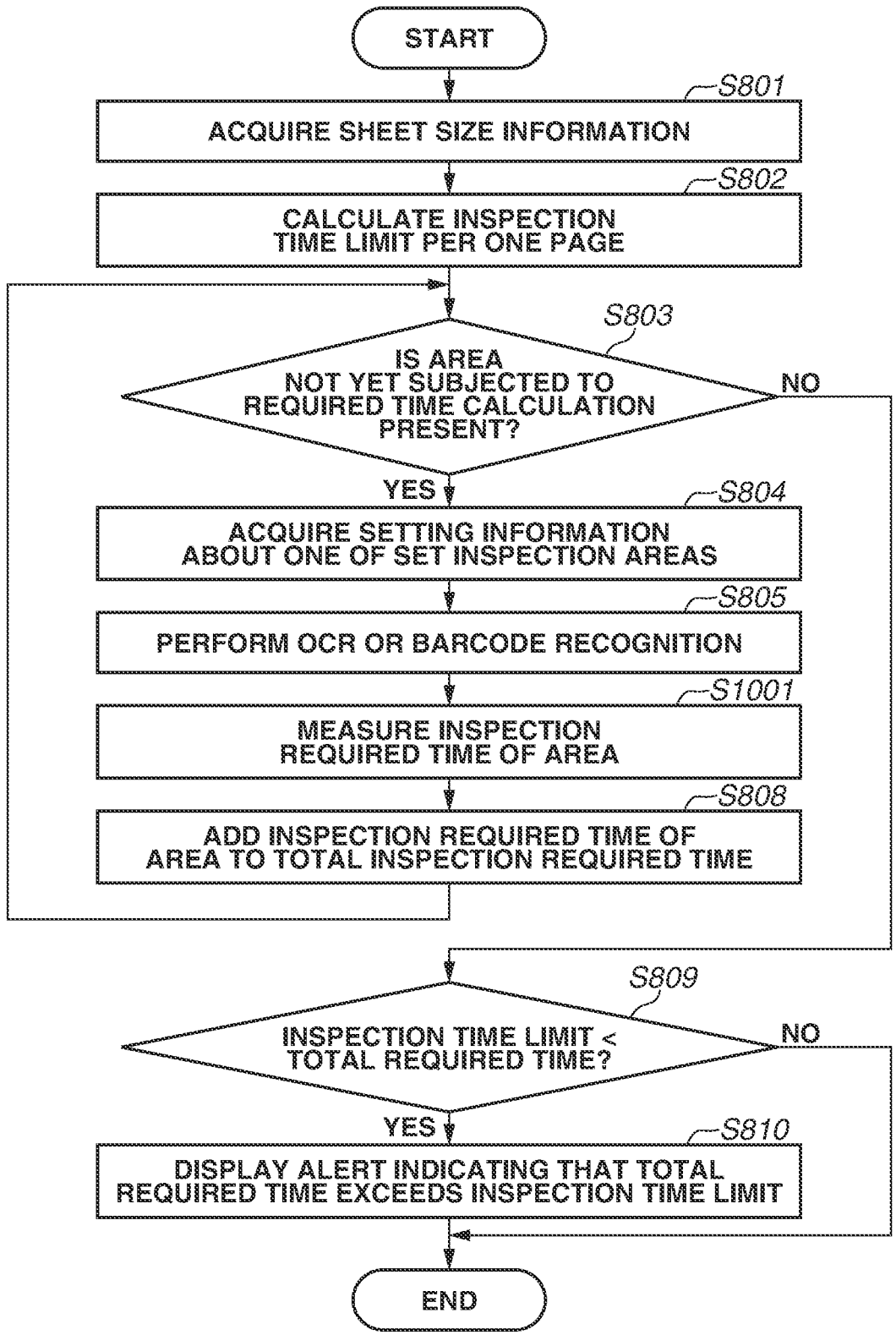

METHOD AND APPARATUS OF INSPECTING PRINTED DOCUMENT

BACKGROUND OF THE INVENTION

Field of the Invention

The present invention relates to a method and an apparatus of inspecting print quality of a printed document.

Description of the Related Art

In recent years, a printing system in which a printed sheet printed by a printing apparatus is inspected by an inspection apparatus during conveyance is known. In the inspection, the inspection apparatus reads an image of the conveyed printed sheet, and determines whether printed contents of the printed sheet are normal, through image analysis of the read image. More specifically, the inspection apparatus can detect missing of a character string or a barcode printed on a printed product, image omission, print defect, page omission, color deviation, printing of an incorrect character string or barcode, and the like. In a case where it is determined that the printed sheet is a defective sheet, the defective sheet is discharged to a sheet discharge destination different from a sheet discharge destination for a normal sheet. This makes it possible to prevent the defective sheet from being mixed into the normal sheets, which enables an operator to discard the defective sheet. Further, in the above-described system, to improve detection accuracy of the defective sheet of the printed document, a method in which the character string or the barcode to be inspected is read by optical character recognition processing (OCR) or barcode recognition processing, and the inspection is performed through comparison with a prepared answer value is known.

In the printing system requiring the inspection, it is necessary to complete the inspection of the printed sheet while the printed sheet is conveyed and passes through the inspection apparatus. If the inspection is not completed in time, the inspection of a subsequent printed sheet cannot be performed on time. This causes mismatch of an inspection result, and a correct inspection result cannot be obtained. Therefore, it is necessary for the operator of such a printing system to perform inspection setting to reduce an inspection required time, which takes labor.

Japanese Patent Application Laid-Open No. 2012-003335 discusses a technique that calculates priority of an inspection target based on print object information (object type, color, and size) on the inspection target, prior to execution of the inspection, and performs only the inspection executable within a predetermined time limit based on the priority. This makes it possible to efficiently inspect only the inspection target high in priority while lowering difficulty of the inspection setting.

The required time until inspection of each printed sheet is completed is generally varied depending on various conditions such as the number, a data amount, and a size of character strings or barcodes to be inspected. Therefore, in a case where the inspection is performed in light of a read result of the character string or the barcode, the inspection required time is normally varied due to difference of various conditions even among the inspection targets having the same object information. Accordingly, the technique discussed in Japanese Patent Application Laid-Open No. 2012-003335 still has an issue in calculation accuracy of the inspection required time when the inspection is performed in light of the read result of the character string or the barcode.

Further, in the technique discussed in Japanese Patent Application Laid-Open No. 2012-003335, the control is performed to inspect only the inspection target high in priority within the time limit. Therefore, inspection of the entire area is not ensured, and it is difficult for the inspection operator to know the actually inspected area.

SUMMARY OF THE INVENTION

The present invention is directed to a printing system that can accurately notify a user of whether a reading inspection of an inspection area of a character string or a barcode preset by the user is performable within a time limit, prior to the inspection.

According to an aspect of the present invention, an information processing apparatus inspecting printed contents of a printed sheet, the information processing apparatus includes a recognition unit configured to recognize the printed contents printed on the sheet, an acquisition unit configured to acquire an attribute value from information recognized by the recognition unit, a specification unit configured to specify a time required for inspection of the printed contents of the sheet by using the attribute value acquired by the acquisition unit, and a notification unit configured to issue a notification to a user based on a result of comparison between the required time specified by the specification unit and a time limit for inspection of the printed contents.

Further features of the present invention will become apparent from the following description of embodiments with reference to the attached drawings.

BRIEF DESCRIPTION OF THE DRAWINGS

FIG. 5A is a diagram illustrating an inspection setting screen.

FIG. 5B is a diagram illustrating the inspection setting screen.

FIG. 6 is a diagram illustrating an inspection area list screen.

FIG. 8 is a flowchart of an inspection time test.

FIGS. 9A and 9B are diagrams each illustrating an alert screen example in a case where an inspection required time exceeds an inspection time limit.

FIG. 10 is a flowchart of the inspection time test.

DESCRIPTION OF THE EMBODIMENTS

Some embodiments of the present invention are described below with reference to drawings. Each of the embodiments of the present invention described below can be implemented solely or as a combination of a plurality of the embodiments or features thereof where necessary or where the combination of elements or features from individual embodiments in a single embodiment is beneficial.

The following embodiments do not limit the invention according to the claims, and all of combinations of characteristics described in the embodiments are not necessarily essential for solving means of the invention.

Figure 1:
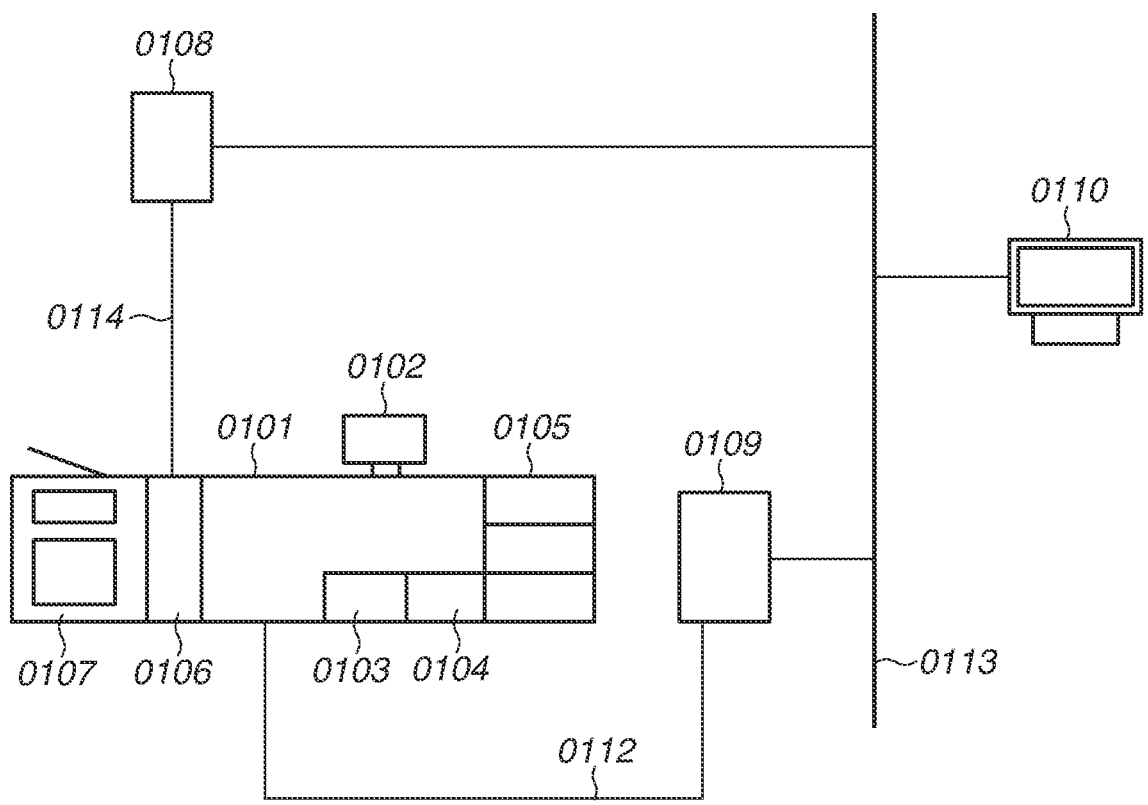
FIG. 1 is a schematic diagram illustrating configurations of an information processing apparatus, an inspection apparatus, and an image forming apparatus.

FIG. 1 is a schematic diagram illustrating configurations of an information processing apparatus 0109, an inspection apparatus 0108, and an image forming apparatus 0101 according to a first embodiment. The image forming apparatus 0101 according to the present embodiment is described by using the image forming apparatus 0101 of an electrophotographic system; however, the image forming apparatus 0101 according to the present embodiment may be an image forming apparatus of the other image forming system such as an inkjet system or an offset system.

The image forming apparatus 0101 is connected to the information processing apparatus 0109 through a cable 0112. The information processing apparatus 0109 is connected to a client computer 0110 and the inspection apparatus 0108 through a network 0113.

The image forming apparatus 0101 includes a user interface (UI) panel 0102, a sheet feeding deck 0103, and a sheet feeding deck 0104. Further, an optional deck 0105 including sheet feeding decks of three stages is connected to the image forming apparatus 0101. The image forming apparatus 0101 is, for example, an electrophotographic image forming apparatus. The UI panel 0102 is a user interface including, for example, an electrostatic capacitance touch panel.

The image forming apparatus 0101 further includes an inspection unit 0106 and a large-capacity stacker 0107. The inspection unit 0106 is connected to the inspection apparatus 0108 through a cable 0114.

The large-capacity stacker 0107 includes a main tray and a top tray, and several thousand sheets can be loaded on the main tray at a time.

A print job is generated by the client computer 0110, is transmitted to the information processing apparatus 0109 through the network 0113, and is managed by the information processing apparatus 0109. Further, the print job is transmitted from the information processing apparatus 0109 to the image forming apparatus 0101 through the cable 0112, and the image forming apparatus 0101 performs printing on a sheet. The print job may be generated and managed by the information processing apparatus 0109, be transmitted to the image forming apparatus 0101 through the cable 0112, and be managed by the image forming apparatus 0101.

The client computer 0110, the information processing apparatus 0109, and the inspection apparatus 0108 may communicate with the image forming apparatus 0101 by being connected to the cable 0112. In other words, the connection mode of the image forming apparatus 0101, the information processing apparatus 0109, and the client computer 0110 illustrated in the present embodiment is illustrative, and various connection modes other than the connection mode illustrated in the present embodiment are adoptable as a matter of course.

Figure 2:
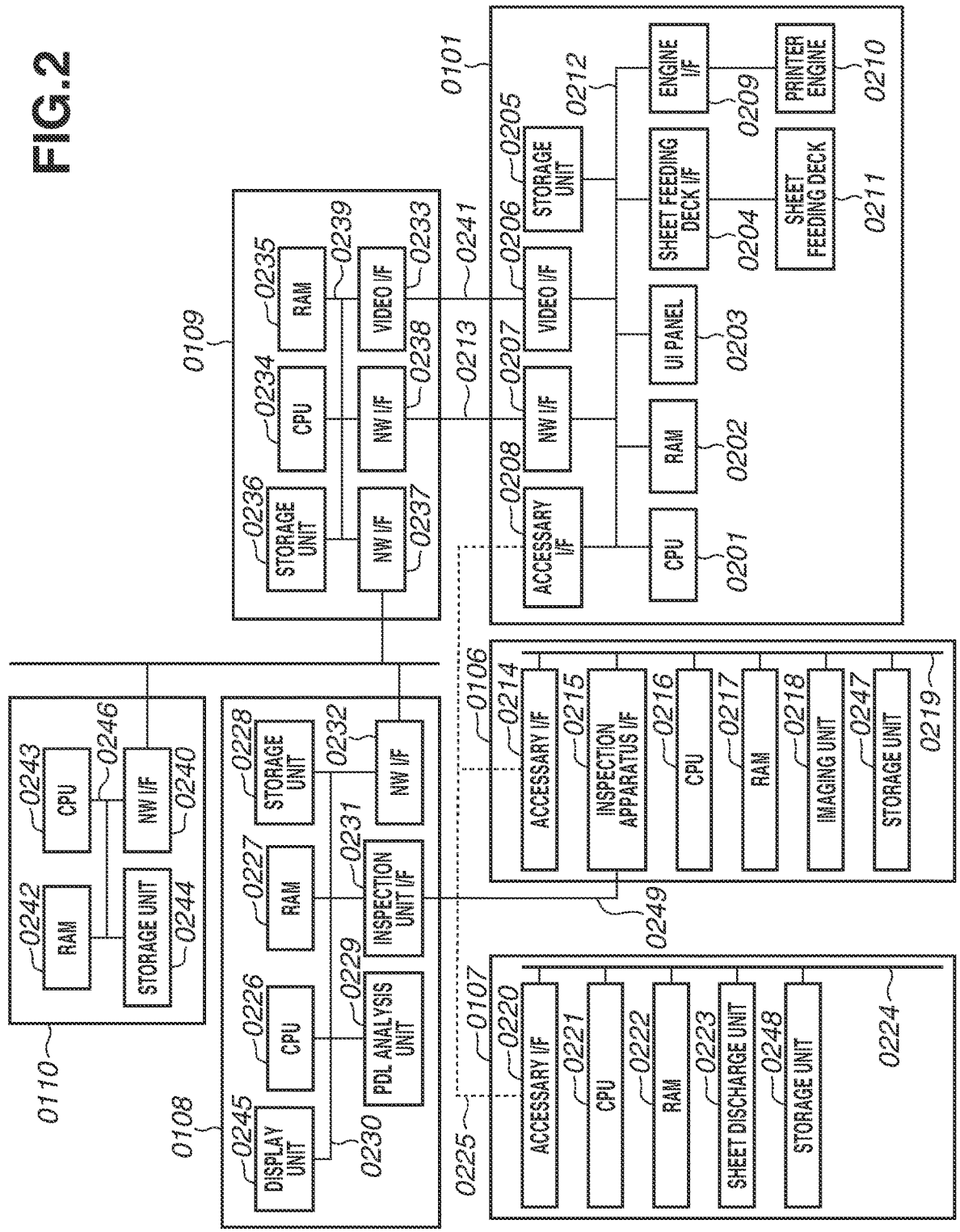
FIG. 2 is a block diagram illustrating the configurations of the information processing apparatus, the inspection apparatus, and the image forming apparatus.

FIG. 2 is a block diagram illustrating control configurations of the image forming apparatus 0101, the inspection apparatus 0108, the large-capacity stacker 0107, the information processing apparatus 0109, and the client computer 0110 according to the present embodiment.

A central processing unit (CPU) 0201 performs control and calculation of each unit in the image forming apparatus 0101 through a system bus 0212. The CPU 0201 executes programs that are stored in a storage unit 0205 and are loaded to a random access memory (RAM) 0202. The RAM 0202 is a kind of general volatile storage device directly accessible from the CPU 0201, and is used as a work area for the CPU 0201 or a temporary data storage area. The storage unit 0205 functions as a temporary storage area and a work memory during operation of the image forming apparatus 0101.

An engine interface (I/F) 0209 performs communication with and control of the printer engine 0210. A sheet feeding deck I/F 0204 performs communication with and control of a sheet feeding deck 0211. The sheet feeding deck 0211 is a generic term of hardware configurations of the sheet feeding decks 0103 and 0104 and the optional deck 0105. A UI panel 0203 is a hardware configuration of the UI panel 0102, and is a user interface to perform the entire operation of the image forming apparatus 0101. In the present embodiment, the UI panel 0203 includes an electrostatic capacitance touch panel.

A network interface (hereinafter, NW I/F) 0207 is connected to an NW I/F 0238 of the information processing apparatus 0109 through a cable 0213, and manages communication between the information processing apparatus 0109 and the image forming apparatus 0101. In this example, the interfaces connected to the system buses 0212 and 0239 are directly connected to each other; however, the information processing apparatus 0109 and the image forming apparatus 0101 may be connected through, for example, a network, and a connection method is not limited. A video I/F 0206 is connected to a video I/F 0233 through a video cable 0241, and manages communication of image data between the information processing apparatus 0109 and the image forming apparatus 0101.

The connection interface of the information processing apparatus 0109 with the image forming apparatus 0101 may have an integrated function of the NW I/F 0238 and the video I/F 0233. Further, the connection interface of the image forming apparatus 0101 with the information processing apparatus 0109 may have an integrated function of the NW I/F 0207 and the video I/F 0206.

An accessary I/F 0208 is connected to an accessary I/F 0214 and an accessary I/F 0220 through a cable 0225. In other words, the image forming apparatus 0101 mutually communicates with the inspection unit 0106 and the large-capacity stacker 0107 through the accessary I/Fs 0208, 0214, and 0220.

A CPU 0216 performs control and calculation of each unit in the inspection unit 0106 through a system bus 0219, and executes programs that are stored in a storage unit 0247 and are loaded to a RAM 0217. The RAM 0217 is a kind of general volatile storage device directly accessible from the CPU 0216, and is used as a work area for the CPU 0216 or a temporary data storage area. The storage unit 0247 functions as a temporary storage area and a work memory during operation of the inspection apparatus 0108. An inspection apparatus I/F 0215 is connected to an inspection unit I/F 0231 through a cable 0249. In other words, the inspection unit 0106 communicates with the inspection apparatus 0108 through the inspection apparatus I/F 0215, and the inspection unit I/F 0231.

An imaging unit 0218 has an imaging function mounted with, for example, a conduct image sensor (hereinafter, CIS), images a sheet passing through the inspection unit 0106, and transmits a captured image to the inspection apparatus 0108 through the inspection apparatus I/F 0215. The CIS of the imaging unit 0218 is an example of a sensor, the sensor may be the other type of sensor such as a charge coupled device (CCD) image sensor, and the imaging method is not limited.

A CPU 0221 performs control and calculation of each unit in the large-capacity stacker 0107 through a system bus 0224, and executes programs that are stored in a storage unit 0248 and are loaded to a RAM 0222. The RAM 0222 is a kind of general volatile storage device directly accessible from the CPU 0221, and is used as a work area for the CPU 0221 or a temporary data storage area. The storage unit 0248 functions as a temporary storage area and a work memory during operation of the inspection apparatus 0108. A sheet discharge unit 0223 performs operation to discharge sheets to the main tray and the top tray, and performs monitoring and control of load states of the main tray and the top tray.

A CPU 0226 performs control and calculation of each unit in the inspection apparatus 0108 through a system bus 0230, and executes programs that are stored in a storage unit 0228 and are loaded to a RAM 0227. The RAM 0227 is a kind of general volatile storage device directly accessible from the CPU 0226, and is used as a work area for the CPU 0226 or a temporary data storage area. The storage unit 0228 functions as a temporary storage area and a work memory during operation of the inspection apparatus 0108. A page-description language (PDL) analysis unit 0229 reads PDL data such as portable document format (PDF) data, PostScript data, and printer control language (PCL) data, received from the client computer 0110 and the information processing apparatus 0109, and performs interpretation processing. A display unit 0245 is, for example, a liquid crystal display connected to the inspection apparatus 0108, and receives user input to the inspection apparatus 0108 and displays a state of the inspection apparatus 0108.

A CPU 0234 performs control and calculation of each unit in the information processing apparatus 0109 through the system bus 0239, and executes programs that are stored in a storage unit 0236 and are loaded to a RAM 0235. The RAM 0235 is a kind of general volatile storage device directly accessible from the CPU 0234, and is used as a work area for the CPU 0234 or a temporary data storage area. The storage unit 0236 functions as a temporary storage area and a work memory during operation of the information processing apparatus 0109. A NW I/F 0237 is connected to NW I/Fs 0232 and 0240 through a network. The information processing apparatus 0109 communicates with the inspection apparatus 0108 through the NW I/Fs 0237 and 0232. Further, the information processing apparatus 0109 communicates with the client computer 0110 through the NW I/Fs 0237 and 0240.

A CPU 0243 performs control and calculation of each unit in the client computer 0110 through a system bus 0246, and executes programs that are stored in a storage unit 0244 and are loaded to a RAM 0242. The RAM 0242 is a kind of general volatile storage device directly accessible from the CPU 0243, and is used as a work area for the CPU 0243 or a temporary data storage area. The storage unit 0244 functions as a temporary storage area and a work memory during operation of the client computer 0110.

Figure 3:
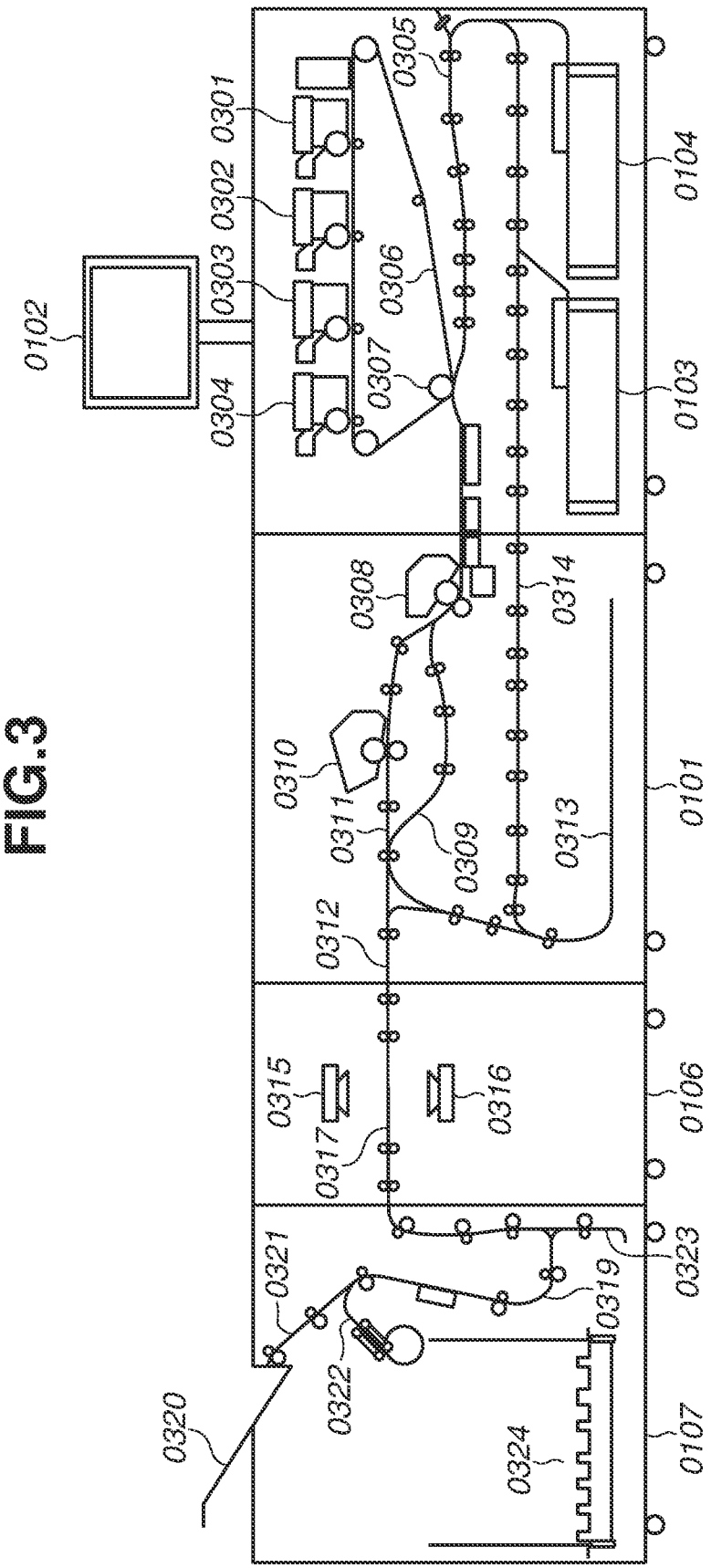
FIG. 3 is a diagram illustrating internal configurations of the information processing apparatus, an inspection unit, the image forming apparatus, and a large-capacity stacker.

FIG. 3 is a diagram illustrating internal configurations of the image forming apparatus 0101, the inspection unit 0106, and the large-capacity stacker 0107. The image forming apparatus 0101 receives user input and displays states of printing and the apparatus through the UI panel 0102. The sheet feeding decks 0103 and 0104 can house various kinds of sheets. Each of the sheet feeding decks 0103 and 0104 can separate only an uppermost sheet of the housed sheets, and convey the sheet to a sheet conveyance path 0305.

Developing stations 0301 to 0304 form toner images by using colored toners of yellow (Y), magenta (M), cyan (C), and black (K), in order to form a color image. The formed toner images are primarily transferred to an intermediate transfer belt 0306. The intermediate transfer belt 0306 rotates in a clockwise direction in FIG. 3, and the toner images are transferred to the sheet conveyed from the sheet conveyance path 0305 at a secondary transfer position 0307. A fusing unit 0308 includes a pressure roller and a heating roller. When the sheet passes between the rollers, the toner is melted and pressed, and the toner images are accordingly fixed onto the sheet. The sheet having passed through the fusing unit 0308 is conveyed to a sheet conveyance path 0312 through a sheet conveyance path 0309. In a case where additional melting and pressing are necessary to fix the toner images because of a type of the sheet, the sheet is conveyed to a second fusing unit 0310 through an upper sheet conveyance path after passing through the fusing unit 0308, is subjected to additional melting and pressing, and is then conveyed to the sheet conveyance path 0312 through a sheet conveyance path 0311. In a case where an image forming mode is a double-sided image forming mode, the sheet is conveyed to a sheet reversing path 0313. After the sheet is reversed by the sheet reversing path 0313, the sheet is conveyed to a double-sided conveyance path 0314, and image transfer on a second surface is performed at the secondary transfer position 0307.

In the inspection unit 0106, CISs 0315 and 0316 are disposed to face each other. The CIS 0315 is a sensor to read an upper surface of the sheet, and the CIS 0316 is a sensor to read a lower surface of the sheet. At a timing when the sheet conveyed to a sheet conveyance path 0317 reaches a predetermined position, the inspection unit 0106 scans the sheet by using the CISs 0315 and 0316. Scanned images are transmitted to the inspection apparatus 0108 through the inspection apparatus I/F 0215 and the inspection unit I/F 0231. The CPU 0226 determines whether each of the received images has a defect, and notifies the inspection unit 0106 of a determination result through the inspection unit I/F 0231 and the inspection apparatus I/F 0215 again. The CPU 0216 notifies the large-capacity stacker 0107 of the received determination result through the accessary I/Fs 0214 and 0220.

The large-capacity stacker 0107 can be loaded with a large number of sheets. The large-capacity stacker 0107 includes a main tray 0324 as a tray loaded with the sheets. The sheet having passed through the inspection unit 0106 enters the large-capacity stacker 0107 through a sheet conveyance path 0319. The sheet is loaded on the main tray 0324 from the sheet conveyance path 0319 through a sheet conveyance path 0322. The large-capacity stacker 0107 further includes a top tray 0320 as a sheet discharge tray. The CPU 0221 discharges a sheet on which a defect is detected by the inspection apparatus 0108, to the top tray 0320. In a case where the sheet is output to the top tray 0320, the sheet is conveyed from the sheet conveyance path 0319 to the top tray 0320 through a sheet conveyance path 0321. A reversing unit 0323 reverses the sheet. The reversing unit 0323 is used to load the sheet on the main tray 0324. In a case where the sheet is loaded on the main tray 0324, the sheet is reversed once by the reversing unit 0323 such that a direction of the entering sheet and a direction of the sheet in a loaded state are coincident with each other. In a case where the sheet is conveyed to the top tray 0320, the sheet is discharged as it is without being flipped at loading. Therefore, reversing operation by the reversing unit 0323 is not performed.

Processing by the system according to the present embodiment is described below with reference to a flowchart and screen examples.

Programs of the image forming apparatus 0101 according to the flow are stored in the storage unit 0205 of the image forming apparatus 0101, are read out to the RAM 0202, and are executed by the CPU 0201. Programs of the inspection apparatus 0108 according to the flow are stored in the storage unit 0228 of the inspection apparatus 0108, are read out to the RAM 0227, and are executed by the CPU 0226. Programs of the information processing apparatus 0109 according to the flow are stored in the storage unit 0236 of the information processing apparatus 0109, are read out to the RAM 0235, and are executed by the CPU 0234. Programs of the client computer 0110 according to the flow are stored in the storage unit 0244 of the client computer 0110, are read out to the RAM 0242, and are executed by the CPU 0243.

Figure 4:
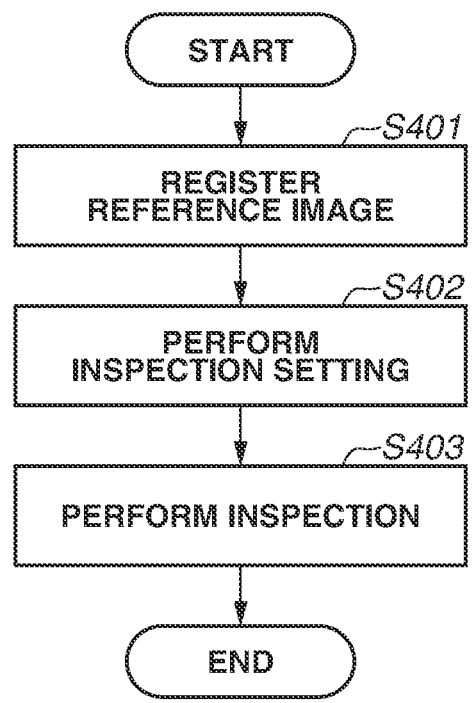
FIG. 4 is a flowchart of entire inspection processing.

FIG. 4 is a flowchart illustrating an entire processing procedure from a reference registration work before start of inspection to execution of the inspection by the inspection apparatus 0108. The CPU 0226 of the inspection apparatus 0108 performs the processing.

First, in step S401, a user registers a reference image as a reference for the inspection. The inspection apparatus 0108 starts reading of the reference image, and the client computer 0110 executes a print job for registration of the reference image.

Next, in step S402, the user performs inspection setting to set various kinds of inspection parameters, an inspection area, and an inspection level. Details thereof are described below.

Next, in step S403, the user starts the inspection by the inspection apparatus 0108, and executes a print job for the inspection by the client computer 0110. When printing is performed, the inspection unit 0106 detects conveyance of the sheet, and scans the sheet by the CISs 0315 and 0316. Scanned images are stored in the RAM 0227 of the inspection apparatus 0108. Each of the stored images is compared with the reference image, and an inspection result is output. The inspection is performed based on set values designated by the user in the inspection setting.

Next, the inspection setting in step S402 is described in detail with reference to FIGS. 5A to 5C, FIG. 6, and a flowchart of FIG. 7. The inspection setting is started by selecting the reference image registered in the reference registration.

Figure 5C:
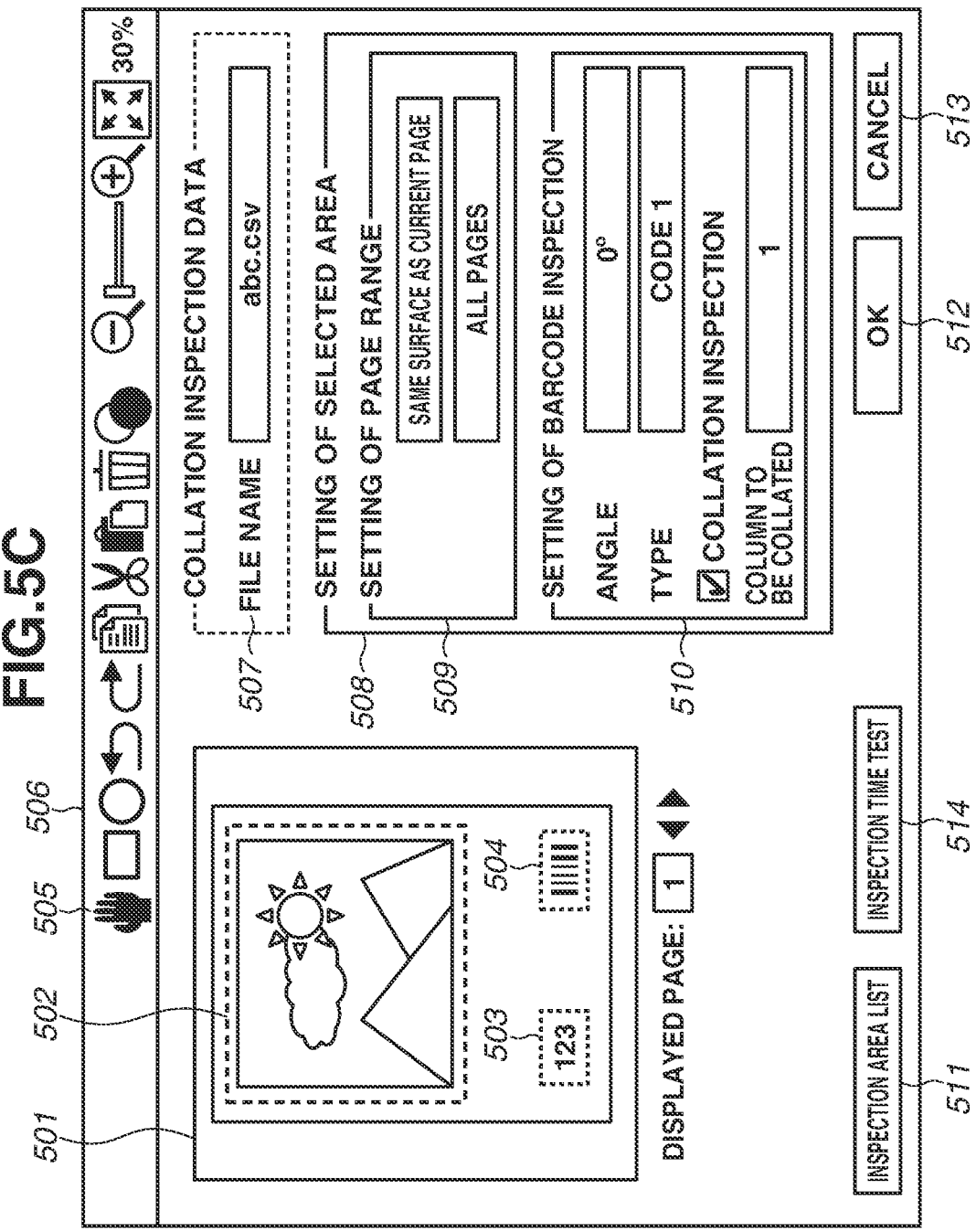
FIG. 5C is a diagram illustrating the inspection setting screen.

FIGS. 5A to 5C each illustrate an example of an inspection setting screen that is displayed on the UI panel 0102 to receive inspection setting execution operation by the user. In the inspection setting screen, the user arranges inspection areas on a previewed reference image, and individually performs setting on each of the inspection areas.

An area 501 is a preview display area where the reference image is displayed. In a case where a plurality of reference images is provided for a print job including a plurality of pages, the reference image corresponding to each of the pages can be displayed by receiving an operation to switch the reference image to be previewed.

Frames 502 to 504 indicate inspection areas arranged on the previewed image. The inspection areas are arranged by an inspection area arrangement button 506, and the size and the position of each of the inspection areas can be changed by mouse drag operation by the user. The frame 502 indicates an arrangement example of a picture inspection area.

The frame 503 indicates an arrangement example of a character-string inspection area. The frame 504 indicates an arrangement example of a barcode inspection area.

A button 505 is an inspection area selection button. When the user presses the inspection area selection button 505 and then clicks any of the frames 502 to 504 indicating the inspection areas with a mouse, operation to select the inspection area is received.

A button 506 is an inspection area arrangement button. When the user presses the inspection area arrangement button 506, selects a type of the inspection area from a displayed pull-down menu, and then selects an area to be designated as the inspection area on the preview display by mouse drag, operation to arrange the inspection area is received.

An item 507 is a setting item to select collation inspection data by a file selection method. The collation inspection data is a reference comma-separated values (CSV) file for data inspection collated when the data inspection is performed. The reference CSV file is a file to be prepared by the user, and is a file in which answer character strings in character string inspection and barcode inspection are listed. At the time of executing the data inspection, reading results of the character-string inspection area and the barcode are collated with the answer character strings listed in the reference CSV file.

An item 508 is a setting item for the selected area, and set values individual for the inspection area selected by the inspection area selection button 505 are displayed.

An item 509 is a setting item for a page range. When the user presses each of buttons, operation to designate a page range to be inspected based on the selected inspection area is received. In a case where nothing is selected, the selected inspection area is disposed only in a page currently displayed in the preview display area 501. In a case where "same surface as current page" is selected, the selected inspection area is disposed on each of the pages corresponding to the same surface based on whether the selected inspection area is disposed on a front surface or a rear surface of the sheet. In a case where "all pages" is selected, the selected inspection area is disposed in all of the pages.

An item 510 is a setting item for each type of the inspection area, and the setting item corresponding to the type of the inspection area selected by the inspection area selection button 505 is displayed. FIG. 5A illustrates the setting items for picture inspection displayed when the picture inspection area 502 is selected. The setting items for the picture inspection include an item indicating a defect to be inspected, a detection level of the fine defect, and the like in inspection of a printed document. The inspection item indicates, for example, a circular defect (spot) and a linear defect (streak). The inspection level includes, for example, five stages from level 1 to level 5, and level 5 can detect a defect thinner and smaller than a defect detectable in the level 1. Further, the level can be set to each inspection item such that, for example, the spot is detected in the inspection level 5, and the streak is detected in the inspection level 4.

FIG. 5B illustrates the setting items for character-string inspection displayed when the character-string inspection area 503 is selected. For each inspection area, an angle of the inspection area, a font of a character string, execution/inexecution of the collation inspection, and a column to be collated in the reference CSV file when the collation inspection is performed are set.

An item to select the font of the character string is displayed, and selection of the font is received from the user.

FIG. 5C illustrates the setting items for barcode inspection displayed when the barcode inspection area 504 is selected. For each inspection area, an angle of the inspection area, a type of barcode, execution/inexecution of the collation inspection, and a column to be collated in the reference CSV file when the collation inspection is performed are set. In the present embodiment, the setting items corresponding to the type of the selected inspection area is displayed to hidden unrelated items; however, all of the items may be displayed while the unrelated items may be disabled, or the unrelated items may be folded and hidden.

A button 511 is an inspection area list display button. When the user presses the button 511, an inspection area list illustrated in FIG. 6 is displayed.

A button 512 is an inspection setting completion button. When the user presses the button 512, the inspection setting is completed and stored in the storage unit 0228, and the inspection setting processing then ends. In a case where the setting has an inconsistency, the inspection setting completion button 512 may be disabled so as to be prevented from being pressed. The inconsistency of the setting indicates that, for example, an inspection area to be subjected to the collation inspection is present, but the setting item 507 for the collation inspection data is not set.

A button 513 is an inspection setting cancel button. When the user presses the button 513, the setting is discarded and the inspection setting processing ends.

A button 514 is an inspection time test button for the set inspection area. When the user presses the button 514, it is possible to test whether the inspection for the set inspection area is settled in a time limit. A procedure of processing performed by the inspection apparatus 0108 when the user presses the button 514 according to the present embodiment is described below with reference to drawings.

FIG. 6 illustrates an example of an inspection area list screen that is displayed on the UI panel 0102, displays a list of the inspection areas under setting, and receives user operation to change the inspection setting. Each row of the list corresponds to any of the arranged inspection areas 502 to 504, a set value 603 corresponds to the button 509, and set values 606 to 610 correspond to the item 510. The user can check and change the set values by selecting each of the inspection areas in the inspection set screen; however, to check the setting of the plurality of inspection areas, a number of operation and a time are required. In contrast, in the inspection area list screen, the user can collectively check and change the set values of the plurality of inspection areas. The inspection area list screen is displayed on the UI panel 0102 in response to pressing of the inspection area list display button 511 by the user. In the present embodiment, the inspection area list screen is assumed to be displayed on a floating window different from the inspection setting screen; however, the inspection area list screen may be displayed by being transited from the inspection setting screen.

A row 601 is a display row for the set values of each of the inspection areas, and receives selection by mouse click of the user. A context menu may be opened by right click, to receive duplication and deletion of a selected inspection area.

A field 602 is a display field of the type of inspection area. A field 603 is a display field of setting of the page range of the inspection area. The inspection area list screen does not have a preview screen. Therefore, in a case where the page range is changed and the above-described erroneous arrangement occurs, the user cannot visually recognize the erroneous arrangement. Thus, the inspection area list screen does not receive operation to set the page range.

A field 604 is a display field of a sheet where the inspection area is arranged.

A field 605 is a display field of a surface on which the inspection area is arranged.

A field 606 is a display field of angle setting of the inspection area. In the present embodiment, as with the page range, in a case where the angle is changed and erroneous setting occurs, the user cannot visually recognize the erroneous setting. Therefore, the inspection area list screen does not receive operation to set the angle.

A field 607 is a display field of font setting of the inspection area, and receives user operation to change the font.

A field 608 is a display field of setting of the barcode type of the inspection area, and receives user operation to change the barcode type. The barcode type is changed depending on a cell size, a data amount, or the like of the barcode.

A field 609 is a display field of setting whether to perform collation inspection of the inspection area, and receives user operation to change the setting about whether to perform the collation inspection.

A field 610 is a display field of setting of the column in the reference CSV file to be collated with the inspection area, and receives user operation to change the setting of the column.

A button 611 is an inspection area list display end button. In a case where pressing of the button 611 is received, display of the inspection area list ends. An inspection time test button 612 is a button having the function that is the same as the function of the inspection time test button 514.

Figure 7:
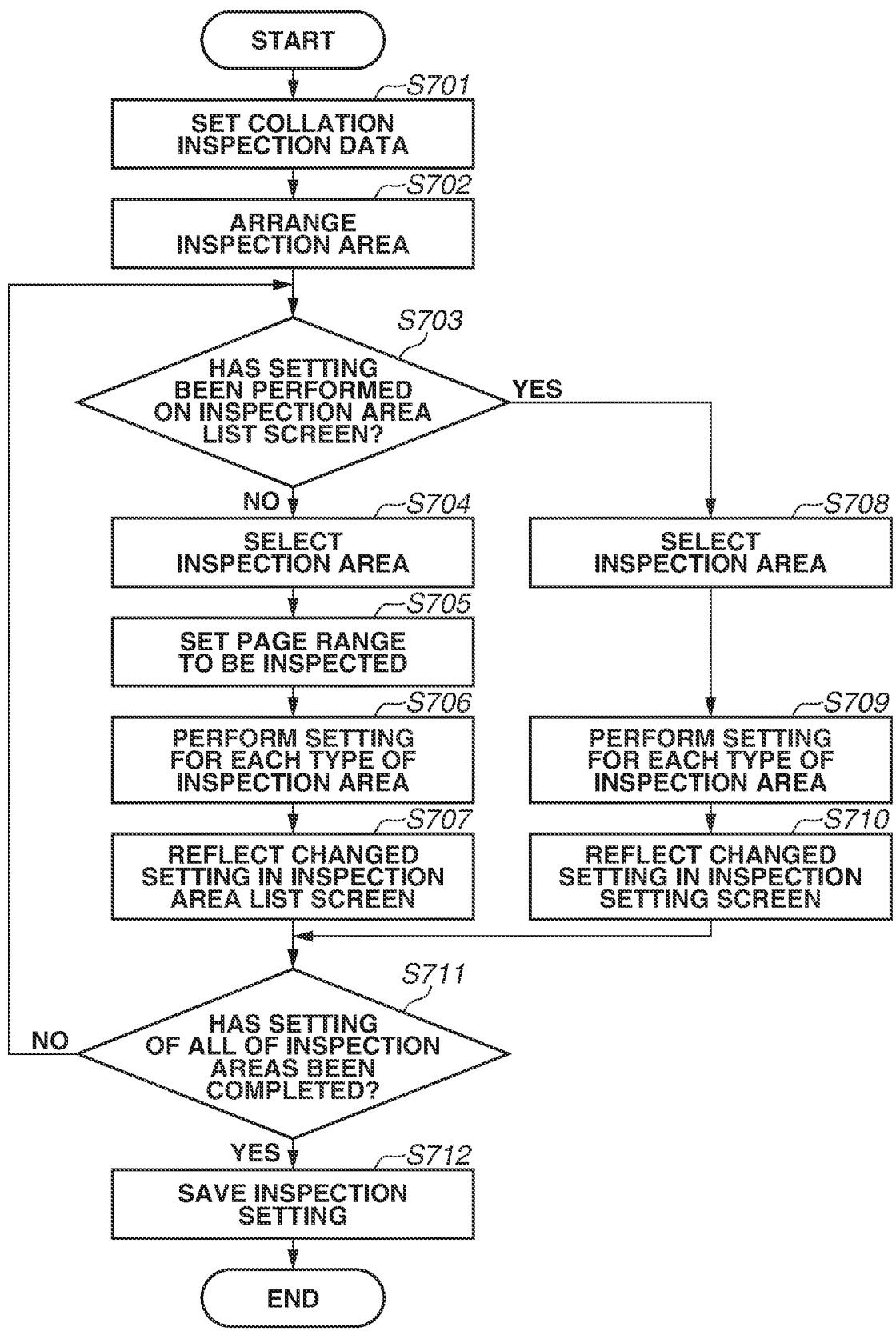
FIG. 7 is a flowchart of inspection setting.

FIG. 7 is a flowchart illustrating a processing procedure by the inspection apparatus 0108 when the inspection setting start operation is performed on the inspection apparatus 0108. The inspection setting screen and the inspection area list screen displayed on the UI panel 0203 of the inspection apparatus 0108 receive the operation, and the CPU 0226 of the inspection apparatus 0108 performs various kinds of processing to perform the inspection setting.

In step S701, the inspection apparatus 0108 receives operation to set the collation inspection data from the inspection setting screen. In the present embodiment, the operation to set the collation inspection data is user operation of the collation inspection data setting item 507.

In step S702, the inspection apparatus 0108 receives operation to arrange the inspection area from the inspection setting screen. In the present embodiment, the operation to arrange the inspection area is user operation of the inspection area arrangement button 506.

In step S703, the inspection apparatus 0108 determines whether the setting individual for the inspection area by the user has been performed on the inspection setting screen (FIGS. 5A to 5D) or on the inspection area list screen (FIG. 6). In a case where the setting has been performed on the inspection setting screen (NO in step S703), the processing proceeds to step S704, and processing in steps S704 to S707 are performed. In a case where the setting has been performed on the inspection area list screen (YES in step S703), the processing proceeds to step S708, and processing in steps S708 to S710 are performed.

In step S704, the inspection apparatus 0108 receives operation to select the inspection area from the inspection setting screen (FIGS. 5A to 5D). In the present embodiment, the operation to select the inspection area is user operation of the inspection area selection button 505 displayed on the UI panel 0203.

In step S705, the inspection apparatus 0108 receives operation to set the page range from the inspection setting screen. In the present embodiment, the operation to set the page range is user operation of the page range setting item 509 displayed on the UI panel 0203.

In step S706, the inspection apparatus 0108 receives setting operation for each type of the inspection area, from the inspection setting screen. In the present embodiment, the setting operation for each type of the inspection area is user operation of the setting item 510 for each type of the inspection area displayed on the UI panel 0203.

In step S707, the inspection apparatus 0108 reflects a result of the setting operation performed by the user on the inspection setting screen, in the inspection area list screen (FIG. 6) to synchronize the display contents.

Subsequently, the processing in steps S708 to S710 are described. Note that the inspection area list screen (FIG. 6) does not have a preview screen. Therefore, in a case where the page range is changed and the erroneous arrangement of the inspection area occurs, the user cannot visually recognize the erroneous arrangement. Thus, the inspection area list screen does not receive operation to set the page range.

In step S708, the inspection apparatus 0108 receives operation to select the inspection area from the inspection area list screen. In the present embodiment, the operation to select the inspection area is user operation of the display row 601 for the set values of each of the inspection areas displayed on the UI panel 0203.

In step S709, the inspection apparatus 0108 receives setting operation for each type of the inspection area, from the inspection area list screen. In the present embodiment, the setting operation for each type of the inspection area is user operation of the display fields 606 to 610 for the respective set values displayed on the UI panel 0203.

In step S710, the inspection apparatus 0108 reflects a result of the setting operation performed by the user on the inspection area list screen, in the inspection setting screen (FIGS. 5A to 5D) to synchronize the display contents.

In step S711, the inspection apparatus 0108 determines whether the inspection setting by the user has been completed. More specifically, the inspection apparatus 0108 determines whether the user has pressed the inspection setting completion button 512. In a case where the inspection setting completion button 512 has been pressed (YES in step S711), the processing proceeds to step S712. In a case where the inspection setting completion button 512 has not been pressed (NO in step S711), the user performs the operation to select the inspection area in step S703 to continue the inspection setting processing.

In step S712, the inspection apparatus 0108 saves the inspection setting in the storage unit 0228, and then ends the inspection setting processing.

FIG. 8 is a flowchart illustrating a processing procedure by the inspection apparatus 0108 when an inspection time test start instruction is issued to the inspection apparatus 0108. The CPU 0226 of the inspection apparatus 0108 starts the processing in response to pressing of the inspection time test button 514 displayed on the UI panel 0203 of the inspection apparatus 0108.

In step S801, the inspection apparatus 0108 acquires a sheet size of the print job under the inspection setting.

In step S802, the inspection apparatus 0108 calculates an inspection time limit per one page of the inspection job under the inspection setting, from the sheet size acquired in step S801.

An example of a method of calculating the inspection time limit in step S802 is described below. Table A is a table illustrating the inspection time limit of the inspection apparatus 0108 per one page of the inspection job, for the sheet size of the print job.

TABLE A

| Sheet size | Time limit per page (Converted based on number of OCR areas) |
| --- | --- |
| A3 | 30 |
| B4 | 30 |
| A4R | 30 |
| A4 | 30 |
| B5R | 30 |
| B5 | 27 |
| A5R | 30 |
| 11 × 17 | 30 |
| LGL | 30 |
| LTR | 30 |
| LTRR | 30 |
| STMTR | 30 |
| SRA3 | 30 |
| 12 × 18 | 30 |
| EXEC | 28 |
| EXEC-R | 30 |
| 13 × 19 | 30 |
| Custom 1 | 22 |
| Custom 2 | 24 |
| Custom 3 | 27 |

The inspection time limit is represented by the number of areas inspectable per one page of the inspection job while the time required for the inspection of one character-string inspection area is assumed to be 1. For example, in a case where the sheet size of the print job is an A3 size, the inspection time limit corresponds to 30 character-string inspection areas. In a case where the sheet size is a B5 size, the inspection time limit corresponds to 27 areas. The inspection apparatus 0108 holds table information illustrating in the table in the storage unit 0228. The inspection time limit illustrated in Table A depends on a sheet conveyance speed of the image forming apparatus 0101. Therefore, it is desirable to hold a table in which, for example, inspection time limits corresponding to the sheet conveyance speeds of various models of the image forming apparatus 0101 are described.

In the present embodiment, as a reference of the inspection time limit, the time required for the inspection of one character-string inspection area is used; however, an actual inspection required time may be measured, and the time limit may be represented by a time representation based on a measurement result, for example, within 500 ms. Alternatively, the time limit may be represented based on other references.

In step S803, the inspection apparatus 0108 determines whether, among the inspection areas subjected to the inspection setting described with reference to FIGS. 5A to 5C, FIG. 6, and FIG. 7, an inspection area not yet subjected to calculation of the inspection required time is present. In a case where such an inspection area is present (YES in step S803) as a result of the determination, the processing proceeds to step S804. In a case where such an inspection area is absent (NO in step S803), the processing proceeds to step S809. A procedure of calculating the required time is described below.

In step S804, the inspection apparatus 0108 acquires setting information about one of the inspection areas subjected to the inspection setting described with reference to FIGS. 5A to 5C, FIG. 6, and FIG. 7.

In step S805, the inspection apparatus 0108 performs OCR or barcode recognition processing based on the inspection setting information acquired in step S804. At this time, it is determined whether any of the OCR and the barcode recognition processing is performed on the target inspection area, based on the type of inspection area 602. More specifically, in a case where the type of inspection area 602 is "character-string inspection", the OCR is performed. In a case where the type of inspection area 602 is "barcode inspection", the barcode recognition processing is performed.

In step S806, the inspection apparatus 0108 acquires attribute values relating to calculation of the inspection required time from a result of the recognition processing performed in step S805. In a case of the character string area, examples of the attribute values relating to calculation of the inspection required time include a font type, a font size, and a length of a character string included in the area. In a case of the barcode, examples of the attribute values include a barcode type, a narrowest width, a cell size, the number of cells, an error correction level, and a length of a decoded character string. In the present embodiment, an example in which the inspection required time is calculated by using some of these attribute values is described; however, the inspection required time may be calculated by using all of these attribute values, or may be calculated by using an attribute value other than the above-described attribute values.

In step S807, the inspection apparatus 0108 calculates the inspection required time of the inspection area from the attribute values of the inspection area acquired in step S806.

Each of Table B and Table C is table information to calculate the inspection required time for each of various kinds of attribute values in the character-string inspection area and the barcode inspection area, acquired by the inspection apparatus 0108 in step S807. The table information is previously held by the storage unit 0228. As an example, a case where the set inspection area acquired in step S804 is a barcode inspection area of code 1, and the attribute values of the area acquired in step S806 are a cell size of 0.7 mm and a data amount of 800 bytes is considered. In this case, in step S807, the inspection apparatus 0108 calculates that the inspection required time of the inspection area is a time corresponding to 10 character-string inspection areas, based on Table C. In the present embodiment, the inspection required time of the character-string inspection area illustrated in Table B is assumed to be a time corresponding to one area irrespective of the attribute values; however, the table information can be set while the inspection required time of the character-string inspection area is assumed to be varied depending on the attribute values. In this case, however, it is necessary to define a combination of reference attribute values, and to define the inspection time limit in Table A, and the inspection required time in Table B and Table C, with the inspection required time in the case of the attribute values as a reference.

TABLE B

| Font type | Font size | Number of characters | Inspection required time (Converted based on number of OCR areas) |
|---|---|---|---|
| Font 1 | Up to 12 pt | Up to 30 characters | 1 |
| | | Up to 100 characters | 1 |
| | Up to 20 pt | Up to 30 characters | 1 |
| | | Up to 100 characters | 1 |

TABLE B-continued

| Font type | Font size | Number of characters | Inspection required time (Converted based on number of OCR areas) |
|---|---|---|---|
| Font 2 | Up to 12 pt | Up to 30 characters | 1 |
| | | Up to 100 characters | 1 |
| | Up to 20 pt | Up to 30 characters | 1 |
| | | Up to 100 characters | 1 |
| ... | ... | ... | ... |

TABLE C

| Barcode type | Cell size | Data amount | Inspection required time (Converted based on number of OCR areas) |
|---|---|---|---|
| Code 1 | Up to 0.5 mm | Up to 100 bytes | 1 |
| | | Up to 1000 bytes | 1 |
| | Up to 1.0 mm | Up to 100 bytes | 5 |
| | | Up to 1000 bytes | 10 |
| Code 2 | Up to 0.5 mm | Up to 100 bytes | 2 |
| | | Up to 1000 bytes | 5 |
| | Up to 1.0 mm | Up to 100 bytes | 10 |
| | | Up to 1000 bytes | 15 |
| ... | ... | ... | ... |

In step S808, the inspection apparatus 0108 adds the inspection required time acquired in step S807 to a total inspection required time for one page of the inspection job. The processing then proceeds to step S803 again. In the present embodiment, the inspection apparatus 0108 calculates the total inspection required time; however, the total inspection required time may be calculated by an apparatus different from the inspection apparatus 0108, and the inspection apparatus 0108 may specify the total inspection required time by acquiring a result of the calculation.

The inspection apparatus 0108 repeats the above-described processing in steps S803 to S808 by the number of set inspection areas, to calculate the total inspection required time per one page of the inspection job.

In a case where it is determined in step S803 that an area not yet subjected to calculation of the required time is absent (NO in step S803), the inspection apparatus 0108 determines in step S809 whether the calculated total inspection required time is greater than the inspection time limit acquired in step S802. In a case where the calculated total inspection required time is greater than the inspection time limit (YES in step S809) as a result of the determination, the processing proceeds to step S810. In a case where the calculated total inspection required time is less than or equal to the inspection time limit (NO in step S809), the processing of this flow ends.

In step S810, the inspection apparatus 0108 displays a screen prompting the user to revise the inspection setting on the UI panel 0203 because the total inspection required time per one page to the set inspection areas exceeds the time limit for the current inspection job.

FIG. 9A illustrates an example of the screen displayed in step S810. In this example, the above-described screen 901 prompting the user to revise the inspection setting is displayed. Performing such display enables the user to easily know whether it is necessary to correct the inspection setting performed by the user.

FIG. 9B illustrates another example of the screen displayed in step S810. In this example, a screen 902 presenting hint information to reduce the inspection required time together with a message prompting the user to revise the inspection setting as described above is displayed. Such hint information displayed together can be used as a reference when the user performs the inspection resetting again.

Further, the screen displayed in step S810 may include other contents. For example, among the inspection areas subjected to the inspection setting, information on the inspection areas may be displayed in descending order of the inspection required time calculated in step S807, and information as a reference for determination of the inspection area to be corrected in setting in order to settle the required time within the time limit may be notified together. Such display is within the scope of the present invention as long as information useful for the user to correct the inspection setting is displayed based on the information obtained by recognizing the character string area or the barcode area.

By performing the embodiment in the above-described processing procedure, the user can accurately know whether the inspection required time based on the inspection setting performed by the user is settled within the time limit of the inspection job, prior to execution of the inspection job. This improves usability of the inspection.

In a second embodiment, the fact that it is possible to easily and efficiently determination whether the inspection required time based on the inspection setting performed by the user is settled within the time limit of the inspection job by appropriately performing the present embodiment, is described with reference to drawings. In the description of the present embodiment, descriptions of configurations and processing procedures that are the same as the configurations and the processing procedures of the first embodiment are omitted, and differences are only described.

FIG. 10 is a flowchart illustrating a processing procedure by the inspection apparatus 0108 when the inspection time test start instruction is issued to the inspection apparatus 0108, according to the present embodiment. The CPU 0226 of the inspection apparatus 0108 starts the processing in response to pressing of the inspection time test button 514 displayed on the UI panel 0203 of the inspection apparatus 0108.

In step S802, the inspection apparatus 0108 acquires the inspection time limit per one page of the inspection job based on time limit table information illustrated in Table D. As illustrated in Table D, the inspection time limit per one page of the inspection job according to the present embodiment is represented in a time format using a unit of millisecond (ms). Note that the time limit table illustrated in Table D is previously held by the storage unit 0228.

TABLE D

| Size | Time limit per page (ms) |
|---|---|
| A3 | 500 |
| B4 | 500 |
| A4R | 500 |
| A4 | 500 |
| B5R | 500 |
| B5 | 450 |
| A5R | 500 |
| 11 × 17 | 500 |
| LGL | 500 |
| LTR | 500 |
| LTRR | 500 |
| STMTR | 500 |
| SRA3 | 500 |
| 12 × 18 | 500 |
| EXEC | 470 |
| EXEC-R | 500 |
| 13 × 19 | 500 |

TABLE D-continued

| Size | Time limit per page (ms) |
|---|---|
| Custom 1 | 370 |
| Custom 2 | 400 |
| Custom 3 | 450 |

In step S802, the inspection apparatus 0108 acquires the time limit of the inspection job based on the time limit table information described in Table D. Thereafter, the processing proceeds to step S1001 through the processing in steps S803 to S805.

In step S1001, the inspection apparatus 0108 measures a required time when the recognition processing is performed on the target inspection area in step S805. The required time may be measured based on time stamp information (not illustrated) in an operation log of the recognition processing in step S805, or may be measured by other methods. Alternatively, the required time of the same inspection area may be measured a plurality of times, and the required time may be calculated by calculating a statistically significant value, for example, the maximum value in the measurement results from a plurality of obtained required times, or by calculating the maximum value considering dispersion from distribution of the obtained required times.

In step S808, the inspection apparatus 0108 adds the required time measured in step S1001 in a manner similar to the processing in the first embodiment.

The processing in steps S803 to S805, S1001, and S808 are performed in this order by the number of set inspection areas. In step S809, the total inspection required time per one page is compared with the inspection time limit per one page acquired in step S802, in a manner similar to that of the first embodiment.

The processing procedure according to the present embodiment described above with reference to FIG. 10 is described by using a specific example of the inspection area.

Figure 5D:
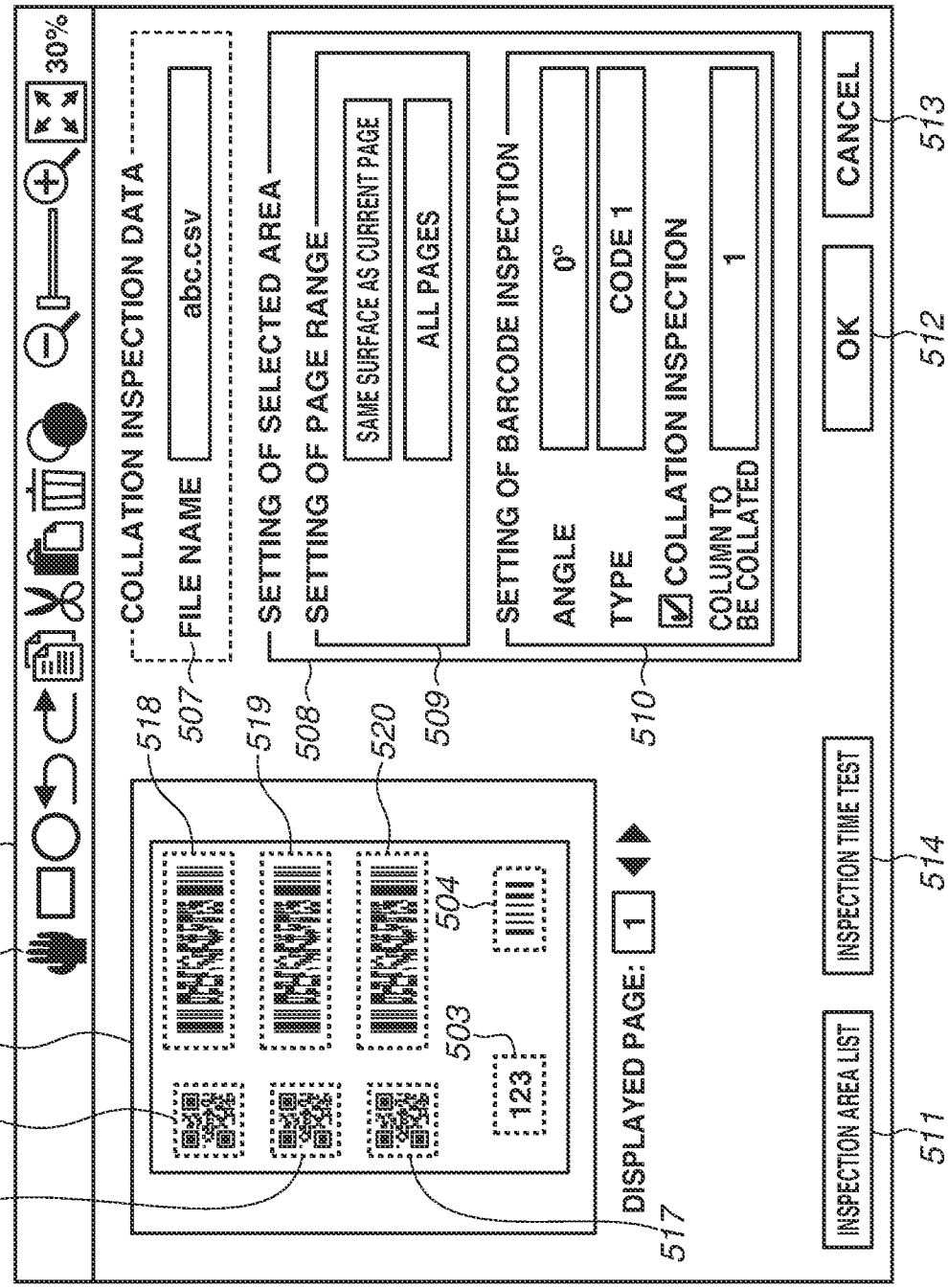
FIG. 5D is a diagram illustrating the inspection setting screen.

It is assumed that the inspection setting is performed as illustrated in FIG. 5D. The area 503 is set as the character-string inspection area, the area 504 and two-dimensional codes 515 to 520 are set as the barcode inspection areas, and the inspection time test button 514 is pressed to start the processing described in FIG. 10. A two-dimensional code indicates a QR Code® or a code such as a barcode as illustrated in FIG. 5D. The sheet size of the inspection job is an A4 size, and the time limit per one page of the inspection job calculated in step S802 based on Table D is 500 ms. Further, the processing in step S1001 is performed on each of the inspection areas, and the inspection required times of the respective inspection areas and the total value thereof are obtained as illustrated in Table E described below. The column of the inspection area indicates a reference numeral of each of the inspection areas in FIG. 5D.

TABLE E

| Inspection area | Inspection required time (ms) |
|---|---|
| 503 | 40 |
| 504 | 15 |
| 515 | 50 |
| 516 | 60 |
| 517 | 50 |

TABLE E-continued

| Inspection area | Inspection required time (ms) |
|---|---|
| 518 | 100 |
| 519 | 90 |
| 520 | 110 |
| Total | 515 |

In this case, in the determination in step S809, the total inspection required time of 515 ms exceeds the inspection time limit of 500 ms. Therefore, a message indicating that the total inspection required time exceeds the inspection time limit is displayed on the UI panel 0203 in step S810.

In the above-described manner, it is possible to perform the present invention by a simpler method without requiring calculation of the inspection required time based on the attribute values obtained from the result of the recognition of the character string or the barcode performed in the first embodiment.

OTHER EMBODIMENTS

In the first embodiment and the second embodiment, as for the processing procedure described with reference to FIG. 8 and FIG. 10, the control to calculate the inspection required time by sequentially performing the processing in steps S803 to S808 and S1001 in series on each of the inspection areas, is described. In a case where the CPU 0226 can perform multithread processing and can perform the processing procedure described in FIG. 8 in parallel, the inspection time limit and the inspection required time can be calculated by performing the processing in steps S803 to S808 and S1001 in parallel in units of the inspection area. For example, a value obtained by multiplying the inspection time limit described in Table A or Table D by the number of threads processable in parallel may be regarded as the inspection time limit, and the value may be compared with the inspection required time calculated in the first embodiment or the second embodiment.

Further, in the case where the image forming mode is the double-sided image forming mode, the CISs 0315 and 0316 of the inspection unit 0106 scan both of front and rear pages at the same time. In this case, the inspection time limit may be set in consideration of whether the inspection is performable in parallel. In other words, in a case where the parallel operation is possible by the multithread, the value obtained by multiplying the inspection time limit described in Table A or Table D by the number of threads processable in parallel may be regarded as the inspection time limit for both surfaces, and the value may be compared with a total inspection required time obtained by adding the inspection required times for both surfaces calculated in the first embodiment or the second embodiment. In a case where both surfaces are inspected by single thread operation, the processing may be performed by regarding a value obtained by dividing the inspection time limit described in Table A or Table D by two, as the inspection time limit per one page.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-196003, filed Dec. 2, 2021, which is hereby incorporated by reference herein in its entirety.

What is claimed is:

1. An information processing apparatus configured to inspect printed contents printed on a sheet, the information processing apparatus comprising:
   one or more processors; and
   at least one memory storing executable instructions, which when executed by the one or more processors, cause the information processing apparatus to:
      perform character recognition processing on a first area on the sheet to recognize printed contents printed included in the first area on the sheet;
      acquire attribute information related to a character string recognized by performing the character recognition processing on the first area;
      determine a time required for inspection of the printed contents included in the first area on the sheet based on the attribute information related to the character string;
      perform code recognition processing on a second area on the sheet to recognize printed contents included in the second area on the sheet, the second area different from the first area;
      acquire attribute information related to a code recognized by performing the code recognition processing on the second area;
      determine a time required for inspection of the printed contents included in the second area on the sheet based on the attribute information related to the code;
      determine a time required for inspection of the sheet based on the time required for inspection of the printed contents included in the first area on the sheet and the time required for inspection of the printed contents included in the second area on the sheet;

determine whether the time required for inspection of the sheet exceeds a predetermined time limit for inspection of the sheet; and issue a notification to a user if the time required for inspection of the sheet is determined to exceed the predetermined time limit for inspection of the sheet.

2. The information processing apparatus according to claim 1, wherein the notification indicates that the time required for inspection of the sheet exceeds the predetermined time limit.

3. The information processing apparatus according to claim 1, wherein the predetermined time limit is preset based on a size of the sheet.

4. The information processing apparatus according to claim 1, wherein the notification unit presents the attribute information related to the code to prevent the time required for inspection of the sheet from exceeding the predetermined time limit.

5. The information processing apparatus according to claim 1, wherein the attribute information related to the code includes an attribute value relating to a two-dimensional code and the attribute information related to the character string includes an attribute value relating to a font printed on the sheet.

6. The information processing apparatus according to claim 5, wherein the two-dimensional code includes a barcode or a quick response (OR) code.

7. The information processing apparatus according to claim 1, further comprising a display, wherein the executable instructions, when executed by the one or more processors, further cause the information processing apparatus to display a setting screen for selection of an inspection area to be arranged on the sheet, the setting screen including an area to set a parameter of the inspection area selected as a target to be arranged on the sheet.

8. The information processing apparatus according to claim 1, wherein the first area is an inspection area designated to handle a font as an inspection target.

9. The information processing apparatus according to claim 1, wherein the second area is an inspection area designated to handle a two-dimensional code as an inspection target.

10. The information processing apparatus according to claim 1, wherein a third area on the sheet is an inspection area designated to handle an image printed on the sheet as an inspection target, the third area being different from the first area and different from the second area.

11. A method of controlling an information processing apparatus configured to inspect printed contents of a printed on a sheet, the method comprising:

performing character recognition processing on a first area on the sheet to recognize printed contents included in the first area on the sheet;

acquiring attribute information related to a character string recognized by performing the character recognition processing on the first area;

determining a time required for inspection of the printed contents included in the first area on the sheet based on the attribute information related to the character string;

performing code recognition processing on a second area on the sheet to recognize printed contents included in the second area on the sheet, the second area different from the first area;

acquiring attribute information related to a code recognized by performing the code recognition processing on the second area;

determining a time required for inspection of the printed contents included in the second area on the sheet based on the attribute information related to the code;

determining a time required for inspection of the sheet based on the time required for inspection of the printed contents included in the first area on the sheet and the time required for inspection of the printed contents included in the second area on the sheet;

determining whether the time required for inspection of the sheet exceeds a predetermined time limit for inspection of the sheet; and issuing a notification to a user if the time required for inspection of the sheet is determined to exceed the predetermined time limit for inspection of the sheet.

12. A non-transitory computer-readable storage medium storing one or more programs including instructions, which when executed by one or more processors of an information processing apparatus configured to inspect printed contents of a printed on a sheet, cause the information processing apparatus to:

perform character recognition processing on a first area on the sheet to recognize printed contents included in the first area on the sheet;

acquire attribute information related to a character string recognized by performing the character recognition processing on the first area;

determine a time required for inspection of the printed contents included in the first area on the sheet based on the attribute information related to the character string;

perform code recognition processing on a second area on the sheet to recognize printed contents included in the second area on the sheet, the second area different from the first area;

acquire attribute information related to a code recognized by performing the code recognition processing on the second area;

determine a time required for inspection of the printed contents included in the second area on the sheet based on the attribute information related to the code;

determine a time required for inspection of the sheet based on the time required for inspection of the printed contents included in the first area on the sheet and the time required for inspection of the printed contents included in the second area on the sheet;

determine whether the time required for inspection of the sheet exceeds a predetermined time limit for inspection of the sheet; and issue a notification to a user if the time required for inspection of the sheet is determined to exceed the predetermined time limit for inspection of the sheet.

\* \* \* \* \*